United States Patent [19]
Ruiz

[11] Patent Number: 5,416,781
[45] Date of Patent: May 16, 1995

[54] INTEGRATED SERVICES DIGITAL NETWORK BASED FACILITY MANAGEMENT SYSTEM

[75] Inventor: John I. Ruiz, Greenfield, Wis.

[73] Assignee: Johnson Service Company, Milwaukee, Wis.

[21] Appl. No.: 852,685

[22] Filed: Mar. 17, 1992

[51] Int. Cl.⁶ .............................................. H04J 3/12
[52] U.S. Cl. ................... 370/110.1; 364/550; 364/571.03; 340/825.06
[58] Field of Search ............ 370/16, 110.1, 94.3, 370/16.1, 85.1, 85.9, 94.1, 94.2, 85.11; 379/96, 93, 94; 364/550, 505, 557, 506, 148, 130, 133, 571.03; 365/12; 236/49.3; 340/825.06, 825.5, 825.51

[56] References Cited

U.S. PATENT DOCUMENTS

| | | | |
|---|---|---|---|
| 4,375,637 | 2/1981 | Desjardins | 340/825.06 |
| 4,825,206 | 4/1989 | Brice, Jr. et al. | 370/16 |
| 4,991,204 | 2/1991 | Yamamoto et al. | 370/16 |
| 4,995,073 | 2/1991 | Okata et al. | 370/110.1 |
| 5,051,992 | 9/1991 | Taniguchi et al. | 370/110.1 |
| 5,130,983 | 7/1992 | Heffner, III | 370/94.1 |
| 5,311,451 | 1/1987 | Barrett | 364/550 |

OTHER PUBLICATIONS

Fujitsu Network Switching Application Profile by Allan Conroy, docket No. 830013.0 (Nov. 6, 1990) (Fujitsu Profile).

*Primary Examiner*—Douglas W. Olms
*Assistant Examiner*—Ajit Patel
*Attorney, Agent, or Firm*—Foley & Lardner

[57] ABSTRACT

A facility management system including facility control devices, monitoring arrangements, and actuating arrangements is provided. Each facility control device is connected to every other facility control device through a group of Integrated System Digital Network (ISDN) bearer channels (B-channels). Each facility control device is further connected to every actuating and monitoring arrangement through an ISDN data channel (D-channel). This facility management system allows each facility control device to communicate with all other facility control devices without any intervening communication processing by other facility control devices. Thus, this system does not create the throughput bottlenecks and reliability problems inherent in systems which necessitate such intervention. The components of this facility management system are networked over telephone lines, thus, the system does not require the installation of separate network lines between each system component.

31 Claims, 6 Drawing Sheets

INTEGRATED SERVICES DIGITAL NETWORK BASED FACILITY MANAGEMENT SYSTEM

FIELD OF THE INVENTION

The present invention relates to monitoring and control functions in environmental control, energy management, maintenance management, lighting control, fire management and security systems for buildings. In particular, the present invention relates to a communication system for transferring data between monitoring devices, control devices, and actuating devices.

BACKGROUND OF THE INVENTION

Facility management systems are systems which generally monitor and control the environment, energy use, and security of a building. Facility management systems generally include monitoring arrangements, facility control devices, and actuating arrangements.

Monitoring arrangements are arrangements which sense one or more environmental parameters and produce a signal representative of the environmental parameter. Monitoring arrangements generally include at least one sensing device and circuitry to produce a signal representative of the sensed parameter. Typical environmental parameters include temperature and pressure. Common sensing devices include thermostats, flow switches, and HVAC system inputs. The circuitry employed to produce the signal may be an analog to digital converter. A monitoring arrangement may also contain additional circuitry to interface with a control device or network.

Facility control devices are devices which receive the environmental data from the monitoring arrangements, analyze the data, and transmit control data. Facility control devices may also receive direct user input through, for example, a keyboard or control panel. Typical facility control devices include network control units, application specific controllers and operator workstations. Network control units include devices such as programmable control panels. Application specific controllers include devices such as air handling unit controllers, intelligent lighting controllers, unitary equipment controllers, variable air volume box controllers, intelligent access controllers, lab and central plant controllers, and intelligent fire controllers. Operator workstations include devices such as personal computers and network terminals.

Actuating arrangements are arrangements which affect the environment, energy use, or security of a building. Actuating arrangements generally include an actuator, an actuated device, and circuitry to interface between the actuator and a control device or network. An actuator is a mechanism to activate process control equipment by use of electronic signals. An actuated device is any device which affects the environment, energy use, or security of a building. Common actuated devices include fans, air conditioning units, heaters, alarms, and multiplexers to which such devices are connected.

As currently practiced, communication between the various components of a facility management system takes place over a plurality of proprietary network systems. For example, network control units may communicate with each other and with operator workstations through a local area network (LAN), such as ARCNET. LANs generally include proprietary network circuit boards which must be installed in each node (facility control device) of the network, communication lines which connect the various network boards to each other, and software to monitor and regulate the information transfer between the nodes. LANs may also require that specialized hardware, such as two-port or multi-port repeaters, be placed between some or all of the nodes of the network to retransmit messages to the network's nodes and/or provide electrical isolation between nodes. The lines connecting the various nodes of a LAN are typically coax cable, twisted pair, or optical fiber.

The numerous lines required to connect the nodes of a local area network may be configured in star, bus, daisy-chain, ring, tree, and mixed configurations. In a star configuration, all nodes are directly connected to a central node. That is, a separate line runs from every node of the network to the central node of the network without passing through any other node of the network. An advantage of the star network is that upon failure of any node other than the central node, communication is not severed between the remaining nodes. One disadvantage of the star configuration is that if the central node fails, the entire network breaks down and no communication is possible among any of the remaining nodes. A further disadvantage of the star configuration is that the central node becomes a bottleneck to network throughput. That is, the central node must process and route all data transmissions, including all transmissions between any two non-central nodes of the network. For example, for a first non-central node to transmit data to a second non-central node, the first non-central node must transmit the data to the central node. The central node receives the data and evaluates the software data header to determine the desired destination node. When the destination node is determined, the central node retransmits the data to the second non-central node. For a network employing such a configuration, the total amount of inter-node communication is limited to the number of transmissions the central node can process. On large networks, such limitations may be severe.

In a bus configuration, nodes are connected to an electrically continuous section of line that is terminated at both ends. One disadvantage of the bus configuration is that the failure of any node may have the effect of severing communications between the nodes connected to one side of the failed node and the nodes connected to the other side of the failed node. Thus, in networks in which intermediary nodes must regenerate signals, a single node failure will split the original network into two independently operating networks which cannot communicate with each other. While this result is less desirable than that which arises from the failure of a non-central node in a star-configured network, it is preferable to the total communication breakdown that would result upon failure of a central node of a star-configured network. A second disadvantage to a bus-configured network is that the communication between any two nodes must be processed by all intermediary nodes, that is, the nodes between the node sending the transmission and the node to which the transmission is sent. The intermediary nodes must, as a minimum, decipher the software address header of every communication to determine whether it is directed to themselves.

A mixed configuration is simply a combination of the star and bus configurations. For example, many nodes may be connected directly to a central node, while one of the non-central nodes is also connected to a bus-configured second set of nodes. The various subconfigurations of a mixed configuration have the same node-failure problems as their corresponding network configurations, as discussed above.

A second network is often required to provide communication between remote facility control devices, such as application specific controllers, and centralized facility control devices, such as network control units. These secondary networks are employed to avoid the expense of extending the primary network to remote locations where some facility control devices, such as application specific controllers, may be located. The types of data transmitted on such secondary networks include time synchronization messages from primary network facility control devices, commands from primary network facility control devices to secondary network facility control devices, data requests from primary network facility control devices to secondary network facility control devices, and responses from secondary network facility control devices to primary network facility control devices. The secondary network facility control device responses may include data representative of identification, changes of state, advisories, requested data values, or complete data bases. The secondary network may link a plurality of facility control devices to a single primary network facility control device. Thus, if a primary network facility control device fails, communication between the nodes of the primary network and the nodes of the secondary network to which the particular failed device was attached would be severed.

A third network may be employed to connect a plurality of monitoring and actuating arrangements to a secondary network facility control device. Many facility management functions require the use of all the networks of a facility management system. For example, for a user of a tri-network facility management system to access the environmental parameter of a particular monitoring arrangement, a series of data transmissions substantially similar to the following must take place:

A first facility control device located on the primary network receives a user request to display the environmental parameter of the monitoring arrangement through a user input device, such as a keyboard. The first facility control device then transmits data indicative of the user request (control data) over the primary network to a second facility control device linked to a secondary network to which the relevant monitoring arrangement corresponds. During the transmission the control data must be processed by all intermediary nodes of the primary network.

The second facility control device transmits the control data over the secondary network to a third facility control device linked to a tertiary network to which the relevant monitoring arrangement is connected. During this transmission the control data must be processed by all intermediary nodes of the secondary network.

The third facility control device reads the signal generated by the relevant monitoring arrangement over the tertiary network. To accomplish this, the third facility device must be capable of separating the signal generated by the relevant monitoring arrangement from the signals of all other monitoring arrangements on the tertiary network. Upon reading the relevant signal, the third facility control device transmits data indicative of the environmental parameter (environmental data) through any intermediary nodes to the second facility control device over the secondary network.

Finally, the second facility control device transmits the environmental data over the primary network through any intermediary nodes to the first facility control device, where the data is ultimately displayed to the user.

Communication techniques such as polling may be employed to alter the exact sequence of the above series of communications. However, the overall number of communication events required by the single operation described would not decrease.

The implementation of such a plurality of networks is both cumbersome and inherently unreliable. The failure of one node may sever communication between large subnetworks of the system. For example, the failure of a facility control device on the primary network will sever communication between the facility control devices on the secondary network to which the failed facility control device is linked and all other components of the facility management system. Likewise, the failure of a facility control device on the secondary network will sever communication between all other components of the facility management system and the monitoring and actuating arrangements on the tertiary network to which the failed facility control device is connected.

A further difficulty arising from the use of a plurality of proprietary networks is that the nodes which link incompatible networks must be equipped with the particular hardware interface and software intelligence required to connect to and communicate over both networks, that is, the node must be "bilingual." A bilingual node must incorporate a plurality of technologies and protocols and is necessarily more complex than one employing a single network technology. The increased complexity of bilingual nodes results in increased costs of designing, manufacturing, maintaining, and repairing such nodes.

The cost of installing the communication lines required by current network-based facility management systems is formidable. Facility management system users must either incur the imposing expense and inconvenience of installing the plethora of wiring required by such networks within the structure of their building, or suffer the inconvenience and aesthetic degradation created by a multitude of visible cables running from room to room between the various facility management devices. The cost of such networks is exacerbated when the wires must be laid across long distances, such as from a temperature sensor in the basement of a large building to a network control unit on the roof of the building. The cost of laying wires between buildings makes multi-building facility management systems even less feasible, especially when the buildings involved are not closely situated. The transmission of signals over such distances also increases the likelihood that special hardware will be required to boost the signal of the data transmission due to signal degradation.

As currently practiced, facility management systems generally employ a plurality of networks to provide communication between the various components thereof. Referring to FIGS. 1 and 2, examples of current facility management systems are shown. FIG. 1 shows a tri-network facility management system 10 with a bus-configured primary network 12 while FIG. 2 shows and a tri-network facility management system 50 with a star-configured primary network 52. As currently practiced, a primary network may also be configured in a mixed-configuration (not shown).

Tri-network facility management system 10 includes bus-configured primary network 12, a secondary network 18, and a tertiary network 24. Bus-configured primary network 12 includes a plurality of primary network facility control devices 11, 12, 15, and 17 which transmit data between themselves over a plurality of bus-configured network lines 16. Secondary network 18 includes a plurality of secondary network facility control devices 19 and 21, and network facility control device 11, which transmit data between themselves over a plurality of secondary network lines 22. Tertiary network 24 includes facility control device 21, an actuating arrangement 26 and a plurality of monitoring arrangements 28 and 30, which communicate over a plurality of tertiary network lines 25.

While facility management system 10 possesses a single secondary network, network 18, and single tertiary network, network 24, a facility management system may possess any number of secondary and tertiary networks.

When primary network facility control device 17 receives a user request to display an environmental parameter sensed by monitoring arrangement 30, facility control device 17 transmits data indicative of the user request (control data) over primary network lines 16, through facility control devices 15 and 13 to facility control device 11 which is a component of secondary network 18. Facility control device 11 then transmits control data over secondary network lines 22 through facility control device 19 to facility control device 21. Facility control device 21 samples the signal generated over tertiary network lines 25 by monitoring arrangement 30. Facility control device 21 then transmits data indicative of the environmental parameter (environmental data) to facility control device 11 over secondary network lines 22 through facility control device 19. Finally, facility control device 11 transmits the environmental data over primary network lines 16 through facility control devices 13 and 15 to facility control device 17, where the data is ultimately displayed to the user.

Referring to FIG. 2, tri-network facility management system 50 includes star-configured primary network 52, a secondary network 58, and a tertiary network 64. Primary network 52 includes a plurality of primary network facility control devices 66, 68, 70, 72, 74, 76, 78, 80 and 82 which transmit data between themselves over a plurality of network lines 84. Secondary network 58 includes a plurality of secondary network facility control devices 86 and 88, and network facility control device 72, which transmit data between themselves over a plurality of secondary network lines 90. Tertiary network 64 includes facility control device 86, a plurality of actuating arrangements 92 and 94, and a monitoring arrangement 96 which communicate over a plurality of tertiary network lines 98.

While facility management system 50 possesses a single secondary network, network 58, and a single tertiary network, network 64, a facility management system may possess any number of secondary and tertiary networks.

A user request for environmental data is processed by facility management system 50 as described above in reference to facility management system 10. However, facility control device 66 is the only primary network intermediary node that must process the communications between facility control device 72, to which secondary network 58 is linked, and any other primary network node.

Both facility management system 10 and facility management system 50 require the use of bilingual facility control devices to link secondary networks with primary networks, and to link tertiary networks with secondary networks. For example, facility control device 11 and facility control device 72 must incorporate the software and hardware required by both the primary and secondary network to which they belong. Likewise, facility control device 21 and facility control device 86 must incorporate the software and hardware required by both the secondary and tertiary networks to which they belong.

Until recently, telephone companies have been managing two separate networks, a circuit switched network for voice calls and a packet switched network for data calls. Acting upon an idea that originated as early as 1959, telephone companies have now begun to combine the capabilities of both networks into a single digital network called Integrated Digital System Network (ISDN). Currently, there are two defined interfaces to ISDN implemented in the United States, the Basic Rate Interface (BRI) and Primary Rate Interface (PRI). The BRI is the replacement for the normal phone line with the difference that the data is transferred in digital form and the line is divided into three logical channels, two bearer channels (B-channels) and one data channel (D-channel). The B-channels are designed to carry either a voice call or a data call. By using digital signalling, the B-channel has the capability of sending data at 64 kilobytes per second, which is presently about 4 times faster than the speed at which a conventional modem can communicate over analog telephone lines. The D-channel is designed to perform out-of-band signalling for the B-channels, such as dialing, call setup, and call tear down, and may also be used for low speed data transmission. The speed of the D-channel is 16 kilobytes per second.

ISDN has been discussed in reference to a limited range of facility management applications. For example, the Fujitsu Network Switching Application Profile by Allan Conroy, docket number 830013.0 (Nov. 6, 1990) (Fujitsu Profile) discloses that a central processor may use the ISDN D-channel permanent virtual circuits and the ISDN B-channel packet services to transmit data to, and receive data from, a plurality of control processors. The facility management system thus disclosed is similar to a star-configured network in that the plurality of communication lines run directly from a single node (the central processor) to every other node of the network. The Fujitsu Profile also discloses that a host computer may transmit data to and receive data from such a central processor using the B-channel circuit data services. While the system described in the Fujitsu Profile may avoid the cost of laying lines for a primary network, it does not address the reliability and bottleneck problems inherent in a star configuration, as discussed above. The Fujitsu Profile does not employ a tertiary network, nor does it disclose any change in the wiring or protocol used to connect sensing and actuating arrangements to its control processors. Rather, the article discloses that its processor to actuator/sensor network would not be replaced by ISDN services.

Accordingly, the need exists for a facility management system in which a single node failure will not cause a severence of communication between the remaining nodes. It is further desirable to provide a facility management system that eliminates the communications bottleneck caused by unnecessary communication processing by intermediary nodes. It is further desirable to provide a facility management system in which a single node failure will not cause a severence of communication between two or more networks. It is further desirable to provide a facility management system which employs a network which does not require the user to incur the expense and aesthetic degradation associated with the installation of new wiring. It is further desirable to provide a facility management system which allows inexpensive expansion of the system over long distances. It is further desirable to provide a facility management system which employs a network that does not require the user to employ special signal-boosting hardware when communicating over long distances. It is further desirable to provide a facility management system which does not require the use of complex and expensive bilingual facility control devices.

SUMMARY OF THE INVENTION

The present invention provides for a facility management system with at least four facility control devices and a means for providing direct communication between each control device and at least three other facility control devices.

The present invention further provides for a facility management system with at least two facility control devices, an actuating arrangement, and a means for providing direct communication between the actuating arrangement and each of the facility control devices.

The present invention further provides for a facility management system with at least two facility control devices, a monitoring arrangement, and a means for providing direct communication between the monitoring arrangement and each of the facility control devices.

The present invention further provides for a facility management system with at least three facility control devices wherein each facility control device is directly coupled to at least two other facility control devices though a B-channel group.

The present invention further provides for a facility management system with a facility control device coupled to an actuating arrangement through a D-channel.

The present invention further provides for a facility management system with a facility control device coupled to a monitoring arrangement through a D-channel.

DETAILED DESCRIPTION OF THE PREFERRED EMBODIMENT

Figure 1:
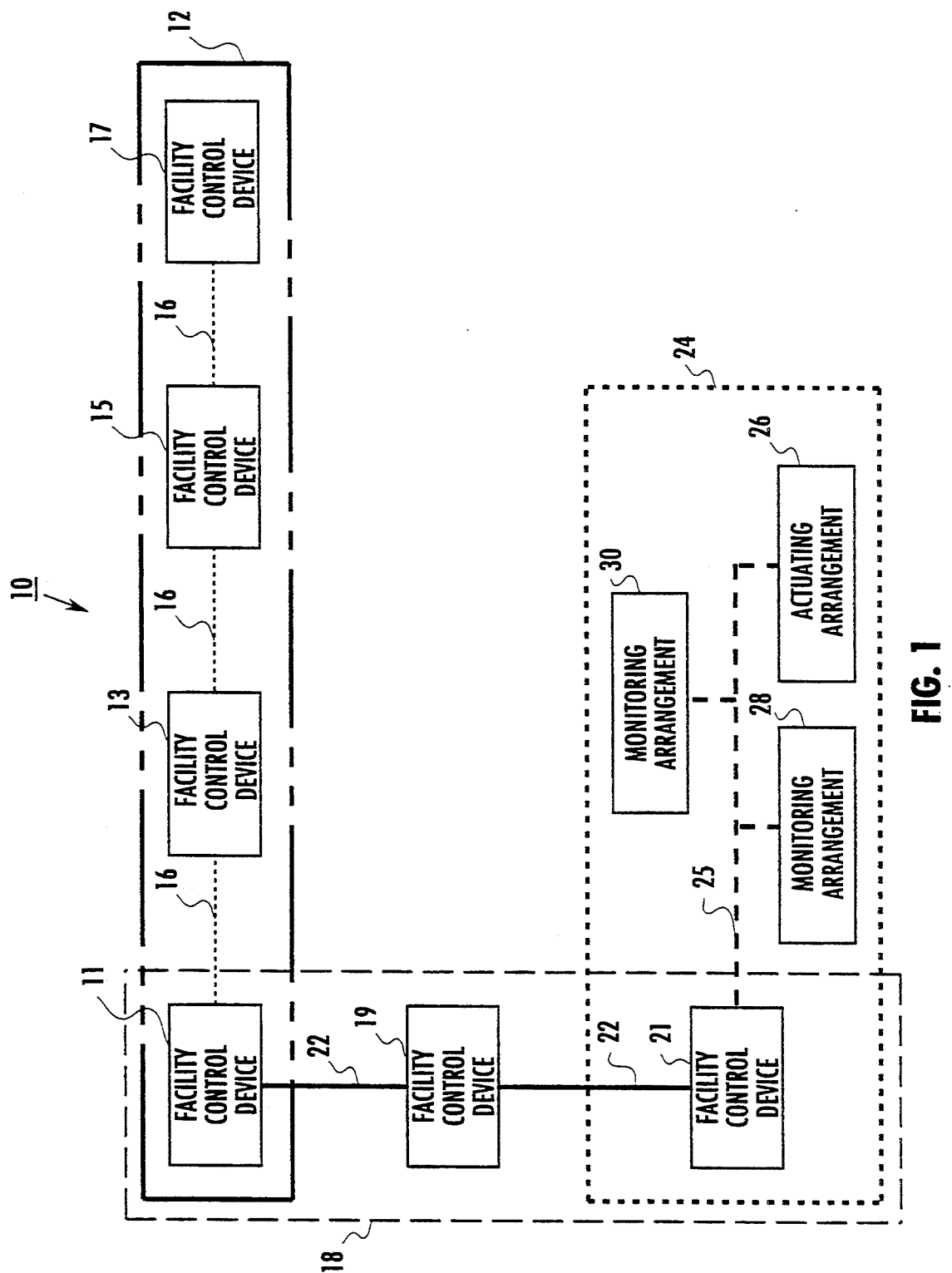
FIG. 1 is a block diagram of a tri-network facility management system with a bus-configured primary network as currently practiced in the art.
Figure 2:
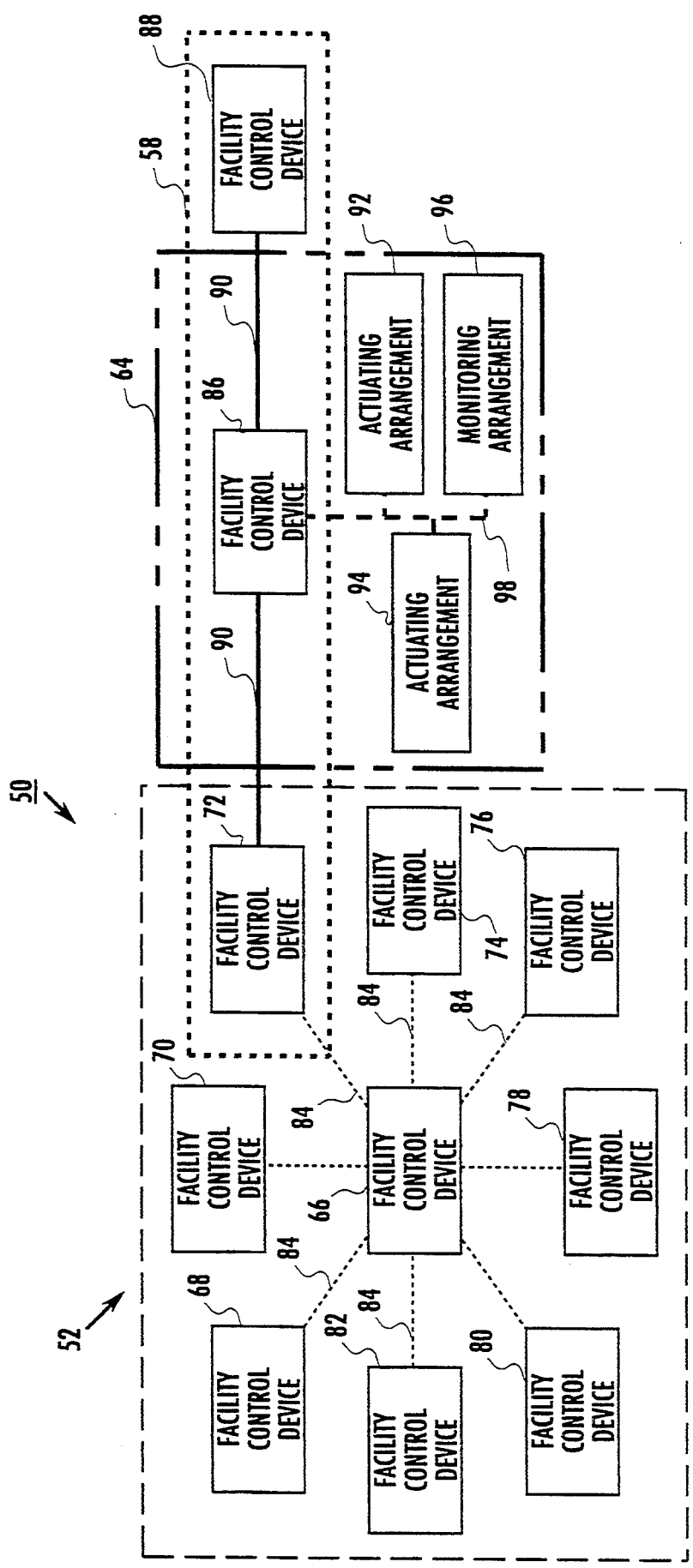
FIG. 2 is a block diagram of a tri-network facility management system with a star-configured primary network as currently practiced in the art.
Figure 3:
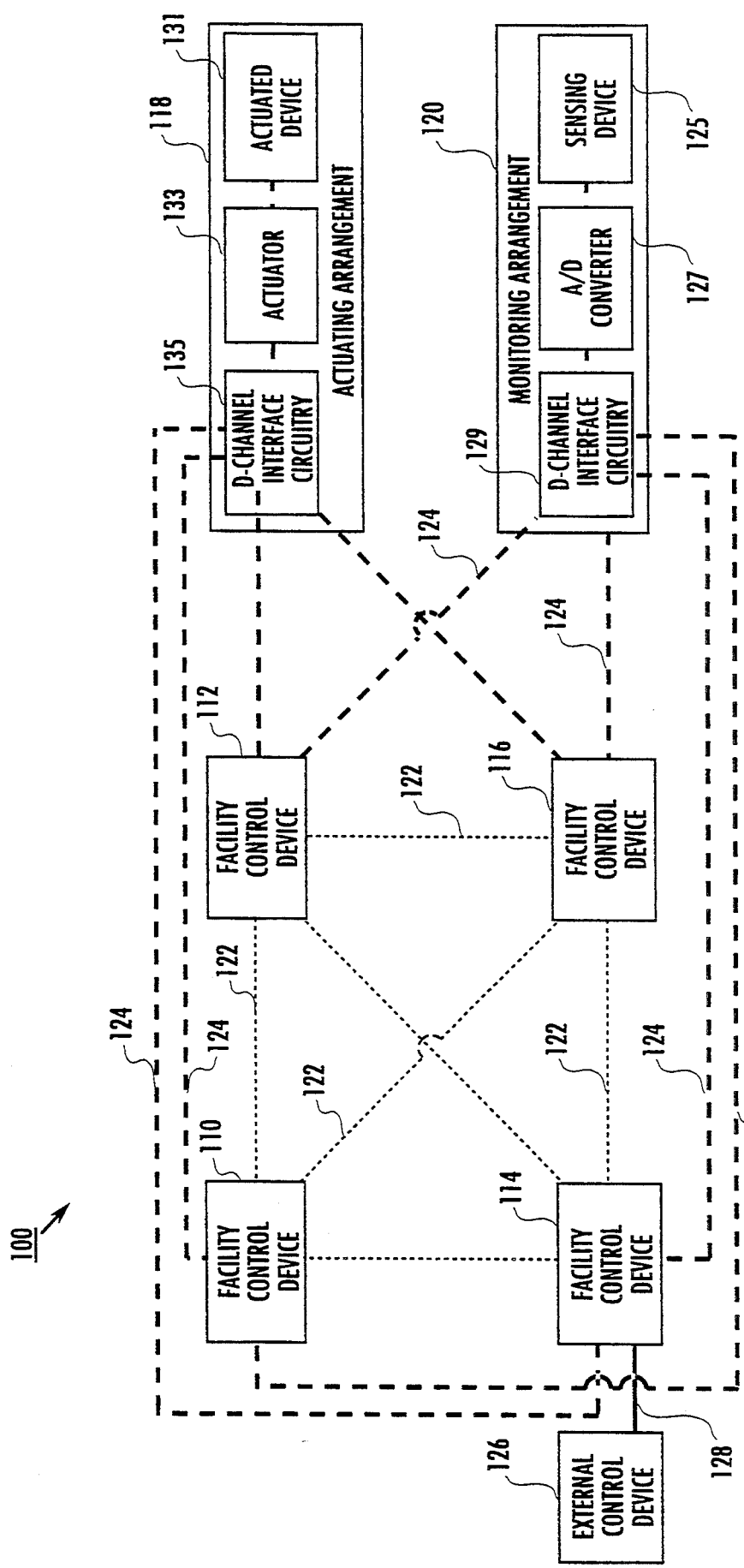
FIG. 3 is a block diagram of an integrated services digital network-based facility management system in accordance with an embodiment of the present invention.

Referring to FIG. 3, a facility management system 100 is shown in accordance with an embodiment of the present invention. Facility management system 100 includes a plurality of facility control devices 110, 112, 114, and 116, each of which can communicate directly with every other facility control device through a plurality of B-channel groups 122. Specifically, a single B-channel group runs between every two facility control devices.

A B-channel group is a group of one or more ISDN B-channels. A B-channel is a 64 KBPS synchronous communication channel used to carry a variety of digital information streams. The information carried by B-channel groups 122 consists of packet-switched data. Although the present invention may alternately be implemented using circuit-switching techniques, packet-switching is preferred in that it makes better use of the total bandwidth of the B-channels.

Current ISDN interfaces provide B-channel groups comprising two B-channels (Basic Rate Interface), twenty-three B-channels (Primary Rate Interface), and thirty B-channels (European Primary Rate Interface). The preferred embodiment of the present invention employs basic rate interfaces, thus providing two B-channels per B-channel group, although it may alternately be implemented with any number of B-channels per B-channel group.

The data passed between facility control devices 110, 112, 114, and 116 is transmitted over B-channel groups 122 in information packages constructed by three protocol layers. First, the data is formatted according to International Telephone and Telegraph Consultative Committee (CCITT) I.430–431 protocol, then according to CCITT Q.920–921 protocol and finally according to CCITT Q.930–931 protocol. However, the B-channel packets can be constructed in accord with any number of protocols, including Link Access Procedure-D protocol (LAPD), High-level Data Link Control (HDLC) or its derivatives, LAP-Balanced (LAPB), or Digital Multi-plexed Interface (DMI) Mode 3.

Communications between facility control devices 110, 112, 114, and 116 of facility management system 100 are direct, that is, they do not involve intermediary facility control devices. Thus, facility management system 100 does not possess the throughput bottlenecks inherent in systems that require message processing by intermediary facility control devices. Further, in facility management system 100, if one facility control device fails, communication between the remaining facility control devices remains unaffected. Thus, facility management system 100 provides a more reliable facility management system than facility management system 10 and facility management system 50.

Facility management system 100 further includes an actuating arrangement 118 and a monitoring arrangement 120, each of which is directly coupled to every facility control device through a plurality of D-channels 124. Specifically, a single D-channel runs between actuating arrangement 118 and each facility control device. Likewise, a single D-channel runs between monitoring arrangement 120 and each facility control device. While facility management system 100 is shown with a single actuating and a single monitoring arrangement, the system 100 may employ any number of monitoring and actuating arrangements without departing from the present invention.

Monitoring arrangement 120 includes at least one sensing device 125, an analog to digital converter 127, and D-channel interface circuitry 129. Sensing device 125 may be any device which senses an environmental parameter. For example, sensing device 125 may be a temperature sensor, a pressure sensor or a humidity sensor.

Analog to digital converter 127 is connected between sensing device 125 and interface circuitry 129. Converter 127 transmits digital signals representative of the environmental parameter sensed by sensing device 125 to interface circuitry 129. The signal may alternately be transmitted by any device capable of generating an electronic signal.

Interface circuitry 129 connects analog to digital converter 127 to D-channels 124 and is configured to allow the digital signal produced by analog to digital converter 127 to be read over D-channels 124 by facility control devices 110, 112, 114, and 116. D-channel interface circuitry is known and currently implemented in a variety of ISDN-aware devices, including commercially available terminal adapters such as AT&T's model 7500B terminal adapter, Fujitsu's model SRS 400 terminal adapter, Hayes' ISDN PC Adapter, and Microcom's Microcom TA.

Actuating arrangement 118 includes at least one actuated device 131, an actuator 133, and D-channel interface circuitry 135. Actuated device 131 may be any device which affects the environment, energy use, or security of a building. For example, actuated device 131 may be a fan, air conditioning unit, heater, alarm, or a multiplexer to which a plurality of such devices are connected.

Actuator 133 controls actuated device 131 by use of electronic signals. Actuator 133 in turn is controlled by signals received over D-channels 124 which are generated by facility control devices 110, 112, 114, and 116. Interface circuitry 135 connects actuator 133 with D-channels 124 and is configured to allow facility control devices 110, 112, 114, and 116 to control actuator 133 by transmitting command signals over D-channels 124.

D-channels 124 are 16 KBPS channels used to carry digital information streams using frame oriented link access procedures. While D-channels are generally used for call setup and network signaling, in system 100 they carry packet-switched data between facility control devices 110, 112, 114, and 116 and actuating arrangement 118, and between facility control devices 110, 112, 114, and 116 and monitoring arrangement 120.

In contrast to the profusion of communication events required to process a single user request in prior art facility management systems, as illustrated above, the number of communication events required to perform the same action on facility management system 100 is reduced. For example, a user request which is input at facility control device 110 for environmental data sensed by monitoring arrangement 120 would require a single sampling by facility control device 110 of the D-channel connecting it to monitoring arrangement 120. User requests entered at any facility control device would be handled equally efficiently.

The data passed between actuating arrangement 118 and facility control devices 110, 112, 114, and 116, and between monitoring arrangement 120 and facility control devices 110, 112, 114, and 116, is transmitted over channels 124 in information packages constructed by three protocol layers. First the data is formatted according to CCITT I.430–431 protocol, then according to CCITT Q.920–921 protocol and finally according to X.31 (also called packet-switched X.25) protocol.

Facility management system 100 further provides an external control device 126. A typical external control device is a remotely located personal computer, or operator workstation. External control device 126 may initiate communication with any component of system 100 as required. To that end, external control device 126 may "dial-in" to the network for limited periods of time to access data and/or transmit user commands to a facility control device of facility management system 100. External control device 126 effectuates this temporary connection through a bearer channel group 128 connected to facility control device 114. In addition, one or more components of facility management system 100 may be configured to initiate communication with external control device 126, for example, to indicate an alarm or failure of some type. While a single external control device is shown, any number of external control devices may temporarily access facility management system 100 through bearer channel groups coupled to one or more of the facility control devices of facility management system 100.

Figure 4:
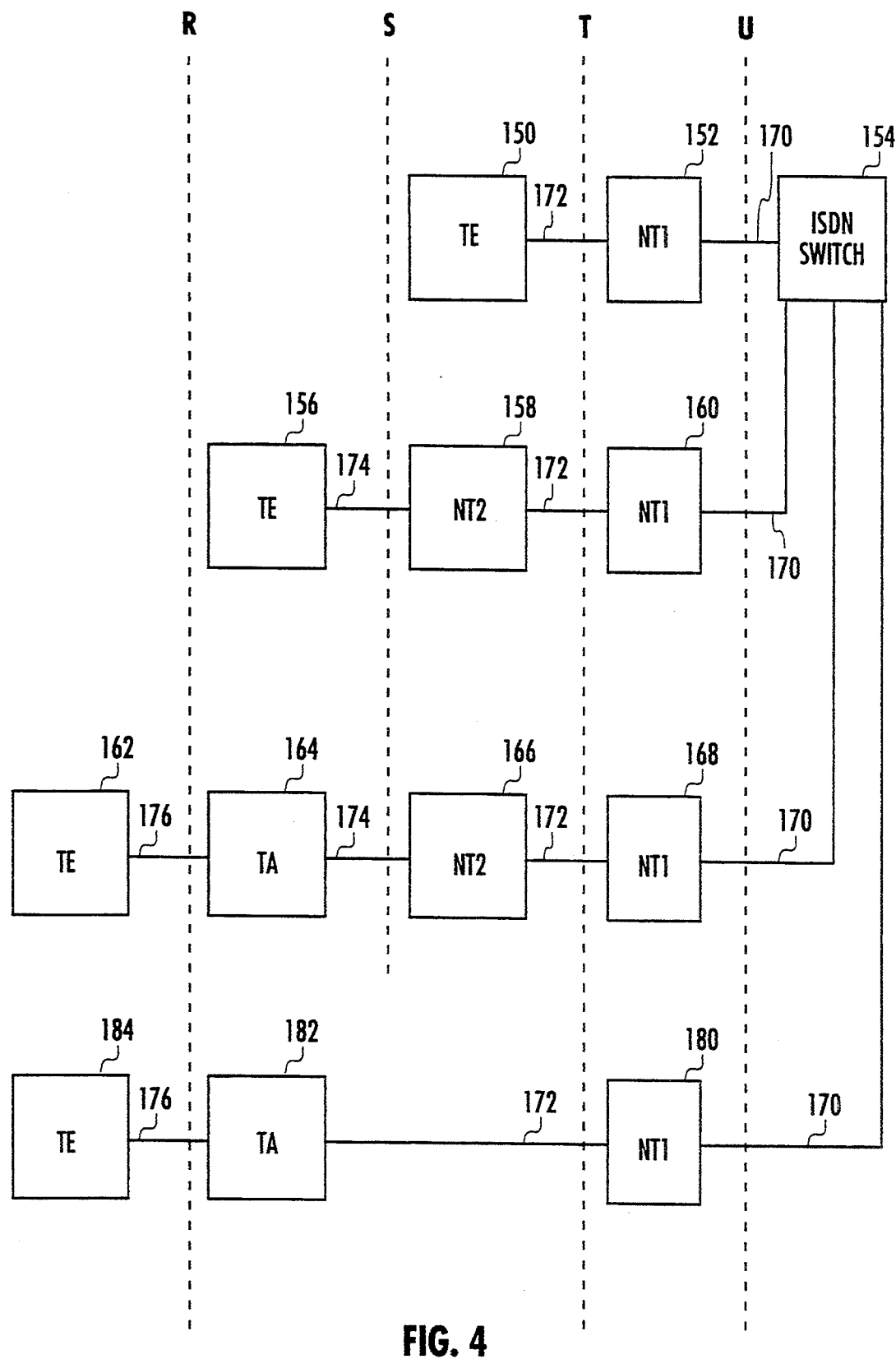
FIG. 4 is a block diagram of alternate physical connections between control devices and an integrated services digital network.

Terminal devices and arrangements (such as control devices, actuating arrangements, and monitoring arrangements) may be physically coupled to an integrated services digital network by any one of a variety of standard interfaces. FIG. 4 illustrates four common ways in which a plurality of terminal devices, 150, 156, 162, and 184 may be physically connected to an integrated services digital network. In addition to the four methods of connection shown, a terminal device which incorporates the necessary hardware interface and software logic may also connect directly to an ISDN switch.

Terminal device 150 is connected by wiring 172 to a type 1 network terminator 152, which in turn is connected to an ISDN switch 154 through wiring 170. A type 1 ISDN terminator is a device which provides an interface between a subscriber's in-house wiring and the local telephone company exchange and performs functions such as providing proper physical and electrical termination of the network line.

Terminator device 156 is connected by wiring 174 to a type 2 network terminator 158, which in turn is connected to ISDN switch 154 through a type 1 network terminator 160. A type 2 ISDN network terminator is a customer premises device which relays routing information for outside calls and connects inside calls. For example, a type 2 network terminator may be a local area network or a private automatic branch exchange.

Terminator device 162 is connected by wiring 176 to a terminal adapter 164, which in turn is connected to ISDN switch 154 through a type 2 network terminator 166 and a type 1 network terminator 168. A terminal adapter is a customer premises device which provides adaptation of existing terminal devices that do not meet ISDN interface requirements, but which do comply with other CCITT recommendations, such as the X-Series for public data networks or the V-Series for modems.

Terminal device 184 is connected to ISDN switch 154 through a terminal adapter 182 and a type 1 network terminator 180.

In accord with a Federal Communication Commission decree, the interface provided by ISDN switch 154 over wiring 170 represents a U reference point. The interface provided by type 1 network terminators 152, 160, 168 and 180 over wiring 172 represents a T reference point, the interface provided by type 2 network terminators 158 and 166 over wiring 174 represents an S reference point, and the interface provided by terminal adapters 164 and 182 over wiring 176 represents an R reference point, as such reference points are defined in the ISDN standards promulgated by the CCITT.

The physical layout of an ISDN-based facility management system will be discussed in greater detail below with respect to FIGS. 5 and 6. However, as discussed above with reference to FIG. 4, components of an integrated services digital network may be physically connected to the network in a variety of configurations based on the hardware interface and software intelligence they incorporate. Thus, while the physical layout of the preferred embodiment is discussed below with reference to specific connections, the present invention is not limited to any particular physical configuration specified herein.

Figure 5:
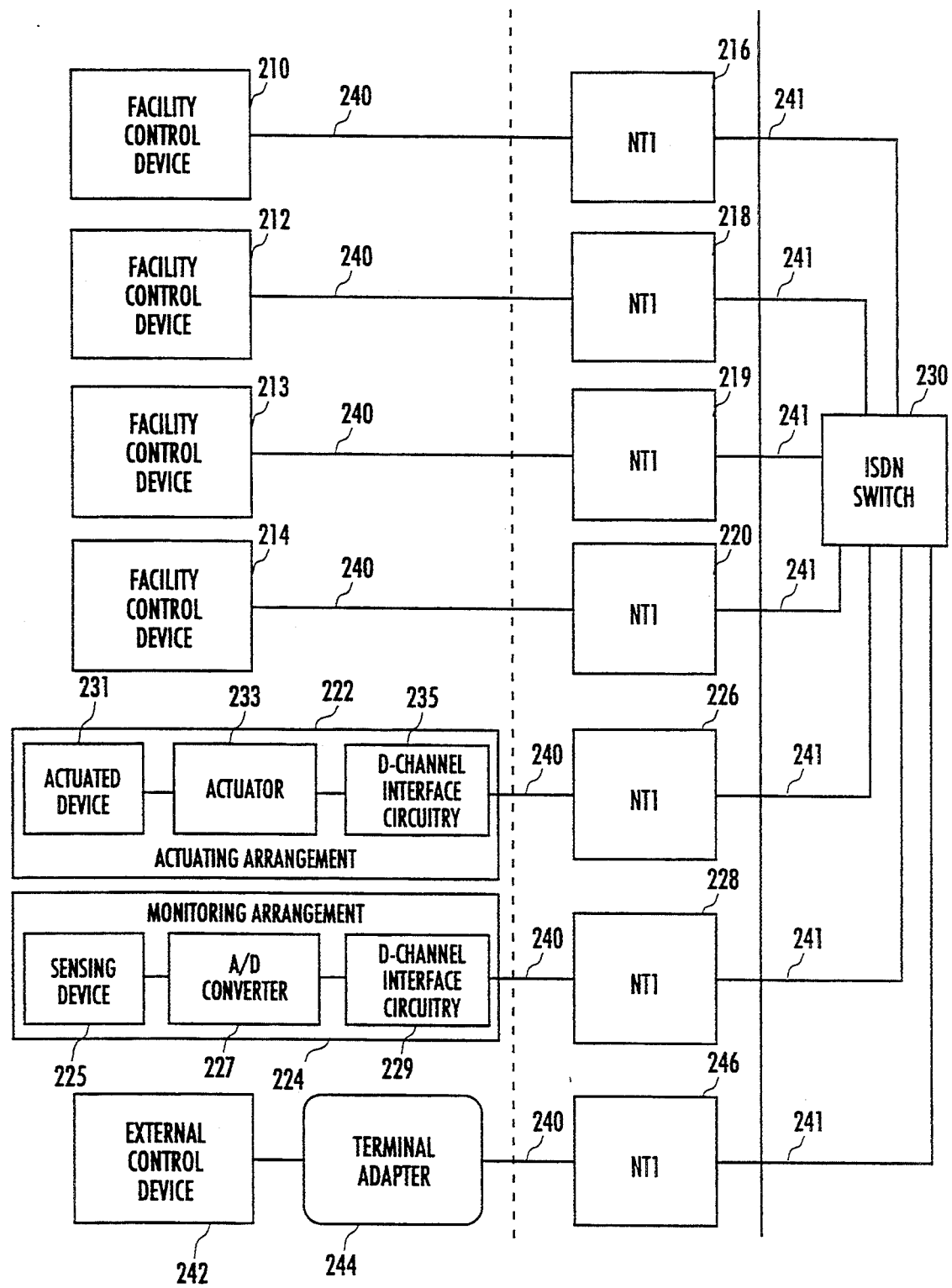
FIG. 5 is a block diagram of the physical connections of a facility management system having control devices connected to the T interface of an integrated services digital network, in accordance with one aspect of the present invention.

Referring to FIG. 5, a facility management system 200 depicts the physical layout of a facility management system having control devices connected at the CCITT-defined T reference point. Facility management system 200 comprises a plurality of facility control devices 210, 212, 213 and 214. Each facility control device is coupled through physical wiring 240 to a type 1 ISDN network terminator (216, 218, 219, and 220 respectively).

Facility management system 200 further comprises an actuating arrangement 222 and a monitoring arrangement 224. Actuating arrangement 222 is coupled through physical wiring 240 to a type 1 network terminator 226. Monitoring arrangement 224 is coupled through physical wiring 240 to a type 1 network terminator 228.

Monitoring arrangement 224 includes at least one sensing device 225, an analog to digital converter 227, and D-channel interface circuitry 229. Sensing device 225 may be any device which senses an environmental parameter. For example, sensing device 225 may be a temperature sensor such as a thermostat, a pressure sensor such as a flow switch, or a humidity sensor such as a HVAC system input.

Analog to digital converter 227 is connected between sensing device 225 and interface circuitry 229. Converter 227 transmits digital signals representative of the environmental parameter sensed by sensing device 225 to interface circuitry 229. The signal may alternately be transmitted by any device capable of generating an electronic signal.

Interface circuitry 229 connects analog to digital converter 227 to network terminator 228 and is configured to allow the digital signal produced by analog to digital converter 227 to be read over wiring 240 by facility control devices 210, 212, 213, and 214.

Actuating arrangement 222 includes at least one actuated device 231, an actuator 233, and D-channel interface circuitry 235. Actuated device 231 may be any device which affects the environment, energy use, or security of a building. For example, actuated device 231 may be a fan, air conditioning unit, heater, alarm, or a multiplexer to which a plurality of such devices are connected.

Actuator 233 controls actuated device 231 by use of electronic signals. Actuator 233 in turn is controlled by signals received over wiring 240 which are generated by facility control devices 210, 212, 213, and 214. Interface circuitry 235 connects actuator 233 with network terminator 226 and is configured to allow facility control devices 210, 212, 213, and 214 to control actuator 233 by transmitting command signals over wiring 240.

Facility management system 200 further comprises an external control device 242 coupled to a type 1 network terminator 246 through a terminal adapter 244. Network terminators 216, 218, 219, 220, 226, 228, and 246 are coupled through physical wiring 241 to an Integrated Services Digital Network Switch 230. The interface provided by ISDN switch 230 over wiring 241 is specified as a U reference point as decreed by the Federal Communication Commission.

In another aspect of the present invention, external control device 242 may include the ISDN interface hardware and software intelligence to communicate directly over ISDN. In such a configuration, external control device 242 is coupled directly to network terminator 246.

While the preferred embodiment of the invention incorporates ISDN interface hardware and software intelligence into facility control devices 210, 212, 213, and 214, to allow the devices to interface directly with network terminators 216, 218, 219 and 220, facility control devices 210, 212, 213, and 214 may alternately access the ISDN services through terminal adapters (not shown) specifically designed to interface with network terminators. Because B-channel groups and D-channels are provided by a single system, the Integrated Services Digital Network, the devices of facility management system 200 need only incorporate a single software intelligence and hardware interface to communicate with all other nodes of facility management system 200.

Terminal adapter 244 may be any one of a number of commercially available terminal adapters. Common terminal adapters include AT&T's model 7500B terminal adapter, Fujitsu's model SRS 400 terminal adapter, Hayes' ISDN PC Adapter, and Microcom's Microcom TA. Network terminators 216, 218, 219, 226, 228, and 246 may also be any of a number of commercially available type 1 network terminators. ISDN switch 230 may be an AT&T 5ESS central office switch, a Northern Telecom DMS-100 central office switch, a private branch exchange (PBX), or an ISDN multiplexor.

Figure 6:
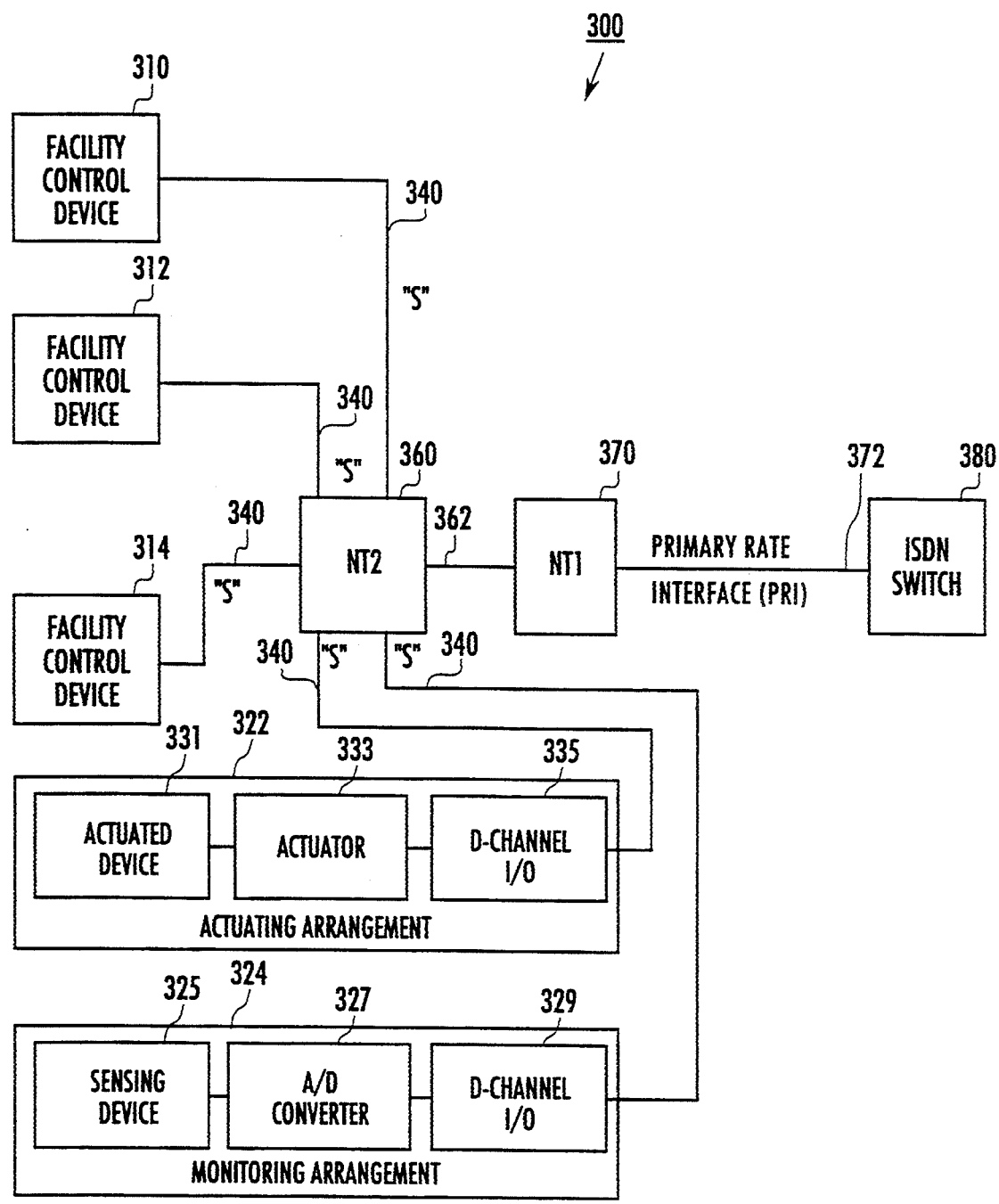
FIG. 6 is a block diagram of the physical connections of a facility management system having control devices connected to the S interface of an integrated services digital network, in accordance with one aspect of the present invention.

Referring to FIG. 6, a facility management system 300 depicts an alternate physical layout of an ISDN-based facility management system. Facility management system 300 comprises a plurality of facility control devices 310, 312, and 314. Each facility control device is coupled through physical wiring 340 to a type 2 ISDN network terminator 360. Network terminator 360 is connected by wiring 362 to a type 1 network terminator 370, which in turn is connected to an ISDN switch 380 through wiring 372.

Facility management system 300 further comprises an actuating arrangement 322 and a monitoring arrangement 324. Both actuating arrangement 322 and monitoring arrangement 324 are coupled through physical wiring 340 to terminator 360.

Monitoring arrangement 324 includes at least one sensing device 325, an analog to digital converter 327, and D-channel interface circuitry 329. Sensing device 325 may be any device which senses an environmental parameter. For example, sensing device 325 may be a temperature sensor such as a thermostat, a pressure sensor such as a flow switch, or a humidity sensor such as a HVAC system input.

Analog to digital converter 327 is connected between sensing device 325 and interface circuitry 329. Converter 327 transmits digital signals representative of the environmental parameter sensed by sensing device 325 to interface circuitry 329. The signal may alternately be transmitted by any device capable of generating an electronic signal.

Interface circuitry 329 connects analog to digital converter 327 to network terminator 360 and is configured to allow the digital signal produced by analog to digital converter 327 to be read over wiring 340 by facility control devices 310, 312, and 314.

Actuating arrangement 322 includes at least one actuated device 331, an actuator 333, and D-channel interface circuitry 335. Actuated device 331 may be any device which affects the environment, energy use, or security of a building. For example, actuated device 331 may be a fan, air conditioning unit, heater, alarm, or a multiplexer to which a plurality of such devices are connected.

Actuator 333 controls actuated device 331 by use of electronic signals. Actuator 333 in turn is controlled by signals received over wiring 340 which are generated by facility control devices 310, 312, and 314. Interface circuitry 335 connects actuator 333 with network terminator 360 and is configured to allow facility control devices 310, 312, and 314 to control actuator 333 by transmitting command signals over wiring 340.

It will be understood that the above description is of the preferred exemplary embodiment of the invention, and that the invention is not limited to the specific form shown. For example, as previously discussed, the present invention may be implemented with three or more facility control devices connected by B-channel groups, or four or more facility control devices connected by other data transmission means. Likewise, the present invention may be implemented with a single monitoring arrangement, a single actuating arrangement, or any number of monitoring and actuating arrangements. Further, an implementation of the present invention need not include any temporarily connectable external control devices, but may optionally contain any number of such devices. Moreover, the physical wiring described above may be replaced by other data transmission media, such as radio or light waves. Various other substitutions, modifications, changes and omissions may be made in the design and arrangement of the elements without departing from the spirit of the invention as expressed in the appended claims.

I claim:

1. A facility management system for controlling an environment having environmental parameters within a building, comprising:
   first, second, third, and fourth facility control devices, each of the first, second, third, and fourth facility control devices being configured to receive environmental data indicative of at least one of the environmental parameters, and generate control data;
   a plurality of communication interfaces operatively coupled to the first, second, third, and fourth facility control devices;
   a plurality of communication lines operatively coupled to the plurality of communication interfaces, the plurality of communication interfaces and communication lines providing direct communication between the first facility control device and the second, third, and fourth facility control devices, providing direct communication between the second facility control device and the third and fourth facility control devices, and providing direct communication between the third facility control device and the fourth facility control device;
   an actuated device for affecting the environment within the building;
   an actuating arrangement, coupled with the actuated device, for controlling the actuated device in response to the control data; and
   first communication means for providing direct communication between the actuating arrangement and at least two of the facility control devices, the actuating arrangement being capable of directly receiving the control data from the at least two facility control devices.

2. The facility management system of claim 1 further comprising:
   a monitoring arrangement including an environment sensor for sensing at least one of the environmental parameters, the monitoring arrangement generating the environmental data representative of the at least one of the environmental parameters; and
   second communication means for providing direct communication between the monitoring arrangement and at least two of the facility control devices, the at least two facility control devices being capable of directly receiving the environmental data from the monitoring arrangement.

3. The facility management system of claim 1 wherein the plurality of communication interfaces and communication lines provide the direct communications through a plurality of ISDN B-channel groups.

4. The facility management system of claim 1 wherein the first communication means further comprises:
   first and second D-channel interfaces, the first D-channel interface being coupled to the actuating arrangement, the second D-channel interface being coupled to at least one facility control device, the first and second D-channel interfaces providing an ISDN D-channel for transmitting the control data between the at least one facility control device and the actuating arrangement.

5. The facility management system of claim 1 further comprising:
   a monitoring arrangement including an environment sensor for sensing at least one of the environmental parameters, the monitoring arrangement generating the environmental data representative of the at least one of the environmental parameters; and
   first and second D-channel interfaces, the first D-channel interface being coupled to the monitoring arrangement, the second D-channel interface being coupled to at least one facility control device, the first and second D-channel interfaces providing an ISDN D-channel for transmitting the environmental data between the at least one facility control device and the monitoring arrangement.

6. The facility management system of claim 1 wherein the first facility control device is directly coupled to the second and third facility control devices through a plurality of B-channel groups, and the second facility control device is directly coupled to the third facility control device through a B-channel group.

7. The facility management system of claim 1 wherein the actuating arrangement has a first D-channel interface, at least one of the facility control devices having a second D-channel interface, the at least one facility control device being coupled to the actuating arrangement through the first and second D-channel interfaces, the at least one facility control device transmitting the control data to the actuating arrangement over a D-channel.

8. The facility management system of claim 1 further comprising first and second D-channel interfaces, the first D-channel interface being coupled to one of the facility control devices, the second D-channel interface being coupled to a monitoring arrangement, the first and second D-channel interfaces being coupled to provide a D-channel between the at least one facility control device and the monitoring arrangement, the monitoring arrangement including an environment sensor being configured to sense one or more of the environmental parameters and the monitoring arrangement configured to generate the environmental data and provide the environmental data to the at least one facility control device over the D-channel.

9. The facility management system of claim 1 further comprising:
   a remotely-located external control device for temporarily accessing at least one of the facility control devices; and
   means for providing communication between the external control device and the at least one facility control device.

10. A facility management system for controlling an environment having environmental parameters within a building, comprising:
   an actuated device for affecting at least one of the environmental parameters of the environment within the building;
   an actuating arrangement, coupled with the actuated device, for controlling the actuated device in response to control data;
   at least two facility control devices for generating the control data based upon environmental data;
   a first communication means including a first plurality of D-channels for providing direct communication between the actuating arrangement and each of the facility control devices across the first plurality of D-channels;
   a monitoring arrangement including an environment sensor for sensing at least one of the environmental parameters, the monitoring arrangement generating the environmental data representative of the at least one of the environmental parameters; and
   a second communication means including a second plurality of D-channels for providing direct communication between the monitoring arrangement and each of the facility control devices across the second plurality of D-channels.

11. The facility management system of claim 10 wherein the first communication means includes at least three D-channels.

12. A facility management system for controlling an environment having environmental parameters within a building, comprising:
   at least two facility control devices configured to generate control data in response to environmental data;
   a monitoring arrangement including an environment sensor for sensing at least one of the environmental parameters and generating the environmental data representative of the at least one environmental parameters;
   a first communication means including a first plurality of D-channels for providing direct communication between the monitoring arrangement and each of the facility control devices, the environmental data generated by the monitoring arrangement being capable of directly communicating to each of the at least two facility control devices through the first plurality of the D-channels;
   an actuated device for affecting the environment within the building;
   an actuating arrangement, coupled with the actuated device, for controlling the actuated device in response to control data; and
   a second communication means including a second plurality of D-channels for providing direct communication between the actuating arrangement and each of the facility control devices through the second plurality of D-channels, the control data being generated by the at least two facility control devices, the at least two facility control devices being capable of directly communicating to the actuating arrangement.

13. The facility management system of claim 12 wherein the first communication means includes at least three D-channels.

14. A facility management system for controlling an environment within a building, comprising:
   first, second, and third facility control devices, each of the first, second, and third facility control devices being configured to receive environmental data indicative of at least one environmental parameter, and generate control data; and
   a plurality of communication interfaces operatively connected to the first, second and third facility control devices, the interfaces configured to provide direct communication between the first facility control device and the second and third facility control devices, and between the second facility control device and the third facility control device, through a plurality of B-channel groups;
   an actuated device for affecting the environment within the building;
   an actuating arrangement, coupled with the actuated device, for controlling the actuated device in response to the control data; and
   first communication means for providing direct communication between the actuating arrangement and at least two of the facility control devices, the actuating arrangement being capable of directly receiving the control data from the at least two facility control devices.

15. The facility management system of claim 14 further comprising:
   a monitoring arrangement including an environment sensor for sensing at least one of the environmental parameters, the monitoring arrangement generating the environmental data representative of the at least one of the environmental parameters; and second communication means for providing direct communication between the monitoring arrangement and at least two of the facility control devices.

16. The facility management system of claim 14 wherein the first communication means is operatively coupled to the actuating arrangement and to at least one of the facility control devices, the communication means being configured to transmit data between the actuating arrangement and at least one of the facility control devices through a D-channel.

17. The facility management system of claim 14 further comprising:

a monitoring arrangement including an environment sensor for sensing one or more environmental parameters, the monitoring arrangement generating the environmental data representative of the one or more environmental parameters; and second communication means operatively coupled to the monitoring arrangement and to at least one of the facility control devices, the second communication means being configured to transmit the environmental data between the monitoring arrangement and the at least one of the facility control devices through a D-channel.

18. The facility management system of claim 14 further comprising:

an external control device for temporarily accessing at least one of the facility control devices; and first and second interfaces operatively connecting the external control device to the at least one facility control device, the first and second interfaces being configured to provide communication between the external control device and the at least one facility control device through a B-channel group.

19. A facilities management system for controlling an environment within a building, the facility management system further comprising:

a facility control device configured to receive environmental data indicative of at least one environmental parameter, analyze the environmental data, and generate control data;

an actuated device for affecting the environment within the building;

an actuating arrangement, coupled with the actuated device, for controlling the actuated device in response to the control data;

a first communication means operatively connected to the facility control device and the actuating arrangement, the first communication means being configured to transmit the control data between the facility control device and the actuating arrangement through a first D-channel;

a monitoring arrangement including an environment sensor for sensing at least one of the environmental parameters, the monitoring arrangement generating the environmental data representative of the at least one of the environmental parameters; and a second communication means operatively connected to the monitoring arrangement and the facility control device, the second communication means being configured to transmit data between the monitoring arrangement and the facility control device through a second D-channel.

20. A facility management system for controlling an environment within a building, comprising:

a facility control device configured to receive environmental data indicative of at least one environmental parameter, analyze the environmental data, and generate control data;

a monitoring arrangement including an environment sensor for sensing at least one of the environmental parameters, the monitoring arrangement generating the environmental data representative of the at least one of the environmental parameters;

a first communication means operatively connected to the facility control device and the monitoring arrangement, the first communication means being configured to transmit the environmental data between the facility control device and the monitoring arrangement through a first D-channel; and an actuated device for affecting the environment within the building;

an actuating arrangement, coupled with the actuated device, for controlling the actuated device in response to control data; and a second communication means operatively connected to the actuating arrangement and the facility control device, the second communication means being configured to transmit the control data between the actuating arrangement and the facility control device through a second D-channel.

21. A facility management system for controlling an environment having environmental parameters within a building, comprising:

first, second, and third facility control devices, each of the first, second, and third facility control devices being configured to receive environmental data, and generate control data responsive to the environmental data;

the first facility control device being coupled to the second facility control device and the third facility control device;

the first facility control device directly communicating through a first B-channel group with the second facility control device;

the first facility control device directly communicating through a second B-channel group with the third facility control device; and the second facility control device being coupled to the third control device, and communicating with the third control device through a communication path comprising one or more B-channel groups, wherein none of the one or more B-channel groups is directly coupled to the first facility control device;

an actuated device for affecting the environment within the building;

an actuating arrangement, coupled with the actuated device, for controlling the actuated device in response to the control data; and first communication means for providing direct communication between the actuating arrangement and at least two of the facility control devices, the actuating arrangement being capable of directly receiving the control data.

22. The facility management system of claim 21 further comprising:

a monitoring arrangement including an environment sensor for sensing at least one of the environmental parameters, the monitoring arrangement generating the environmental data representative of the at least one of the environmental parameters; and second communication means for providing direct communication between the actuating arrangement and at least two of the facility control devices.

23. The facility management system of claim 21 further comprising:

first and second D-channel interfaces, the first D-channel interface being coupled to the actuating arrangement, the second D-channel being coupled to at least one of the first, second, and third facility control devices, the at least one of the first, second and third facility control devices being coupled to the actuating arrangement through the first and second D-channel interfaces, the control data being transmitted from the at least one of the first, second and third facility control devices to the actuating arrangement through a D-channel.

24. The facility management system of claim 21 further comprising:

a monitoring arrangement for sensing one or more environmental parameters and generating, the environmental data representative of the one or more environmental parameters; and first and second D-channel interfaces, the first D-channel interface being coupled to the monitoring arrangement, the second D-channel being coupled to at least one of the first, second, and third facility control devices, the at least one of the first, second, and third facility control devices being coupled to the monitoring arrangement through the first and second D-channel interfaces, the environmental data is transmitted from the monitoring arrangement to the at least one first, second and third facility control devices through a D-channel.

25. The facility management system of claim 21 wherein the first communication means includes first and second D-channel interfaces, the first D-channel interface being coupled to the actuating arrangement, the second D-channel being coupled to at least one of the first, second and third facility control devices, the at least one of the first, second and third facility control devices being coupled to the actuating arrangement through the first and second D-channel interfaces, the control data being transmitted from the at least one of the first, second and third facility control devices to the actuating arrangement through a D-channel.

26. The facility management system of claim 21 further comprising an actuated device for affecting the environment within the building, and an actuating arrangement coupled with the actuated device for controlling the actuated device in response to control data; and first and second D-channel interfaces, the first D-channel interface being coupled to the actuating arrangement, the second D-channel being coupled to at least one of the first, second and third facility control devices, the at least one of the first, second and third facility control devices being coupled to the actuating arrangement through the first and second D-channel interfaces, the control data being transmitted from the at least one of the first, second and third facility control devices to the actuating arrangement through a D-channel.

27. The facility management system of claim 21 further comprising:

an external control device for temporarily accessing at least one facility control device; and first and second B-channel interfaces configured to provide communication between the external control device and the at least one facility control device through a B-channel group.

28. A facility management system for controlling an environment within a building, comprising:

a facility control device configured to receive environmental data indicative of at least one environmental parameter, and generate control data;

an actuated device for affecting the environment within the building;

an actuating arrangement, coupled with the actuated device, for controlling the actuated device in response to the control data;

the facility control device having a first D-channel interface, the actuating arrangement having a second D-channel interface, the first D-channel interface being coupled to the second D-channel interface, the facility control device sending the control data to the actuating arrangement over a first D-channel;

a monitoring arrangement including an environment sensor for sensing at least one of the environmental parameters and the monitoring arrangement generating the environmental data representative of the one or more environmental parameters; and a third D-channel interface coupled to the monitoring arrangement and to the first D-channel interface, the monitoring arrangement transmitting the environmental data to the facility control device over a second D-channel.

29. A facility management system for controlling an environment within a building, comprising:

a facility control device configured to receive environmental data indicative of at least one environmental parameter, and generate control data, the facility control device having a first D-channel interface; and a monitoring arrangement coupled to the first D-channel interface through a second D-channel interface, the monitoring arrangement including an environment sensor for sensing one or more environmental parameters, the monitoring arrangement being configured to generate the environmental data and to transmit the environmental data representative of the one or more environmental parameters to the facility control device through the first and second D-channel interfaces; and an actuating arrangement, coupled with the actuated device, for controlling the actuated device in response to control data; and a third D-channel interface coupled to the first D-channel interface and to the actuating arrangement, the facility control device being capable of transmitting the control data to the actuating arrangement through the first and third D-channel interfaces.

30. A facility management system for controlling an environment having environmental parameters within a building, comprising:

a plurality of facility control devices, each of the plurality of control devices being configured to receive environmental data indicative of at least one environmental parameter, analyze the environmental data, and generate control data;

a monitoring arrangements including an environment sensor being configured to sense at least one of the environmental parameters and the monitoring arrangement being configured to generate the environmental data representative of the at least one environmental parameters;

an actuated device for affecting the environment within the building;

an actuating arrangement coupled with the actuated device, for controlling the actuated device in response to the control data;

a plurality of B-channel groups operatively coupled to the facility control devices, the plurality of B-channel groups being configured to transmit digital data between the facility control devices, the B-channel groups providing direct digital communication between each facility control device of the plurality of facility control devices; and a first D-channel interface operatively coupled to the facility control devices, and the monitoring arrangement, and a second D-channel interface operatively coupled to the facility control devices and the actuating arrangement, the first D-channel interface being configured to transmit the environmental data between the monitoring arrangement and each of the facility control devices, and the second D-channel interface being configured to transmit the control data between the actuating arrangement and the facility control devices, the first D-channel interface providing direct digital communication between the monitoring arrangement and each of the plurality of facility control devices, and the second D-channel interface providing direct digital communication between the actuating arrangement and each of the plurality of facility control devices.

31. The facility management system of claim 19, wherein the environmental parameters are related to pressure and temperature.

* * * * *